April 28, 1925.  
C. C. COLLINS  
SHAFT COUPLING  
Filed Sept. 29, 1921  
1,535,293

WITNESSES  
Frank B. Cook  
F. T. Chapman.

C. C. Collins  
INVENTOR

BY  
ATTORNEY

Patented Apr. 28, 1925.

1,535,293

UNITED STATES PATENT OFFICE.

COY CLAY COLLINS, OF HILLSBORO, NORTH CAROLINA.

SHAFT COUPLING.

Application filed September 29, 1921. Serial No. 504,043.

*To all whom it may concern:*

Be it known that I, COY C. COLLINS, a citizen of the United States, residing at Hillsboro, in the county of Orange and State of North Carolina, have invented a new and useful Shaft Coupling, of which the following is a specification.

This invention has reference to shaft couplings, particularly for connecting the bobbin shafts and spindle drive shafts of roving frames in cotton mills or in other relations, whereby to replace a straight cast-iron sleeve such as is customarily used, and thereby avoid the objections which occur with respect to the use of such sleeves because of their liability to slip where they come together and thus become displaced, both in a rotary and an endwise direction.

In accordance with the invention, the adjacent ends of the shaft are halved longitudinally for an appropriate, but short, distance, and overlap, thus fully overcoming the possibility of rotary slip, and then, by traversing the overlapping portion of the joined shafts, by a pin occupying a diametric position with respect to the shafts, end slip is effectively overcome.

The coupling sleeve is held in position by set screws traversing the body of the sleeve and engaging both portions of the shaft, but in such a manner as not to be subjected to any strains whatever. The improved coupling may be installed upon old shafts in roving frames.

Tests have shown that the coupling sleeve may be successfully made of cast iron with the locking pin of hardened steel, while the set-screws are provided with cup points whereby the entire installation is not only cheap in construction, but is particularly substantial in use.

The invention will be best understood from a consideration of the following detailed description taken in connection with the accompanying drawing forming part of this specification, with the understanding, however, that the invention is not confined to any strict conformity to the showing of the drawings, but may be changed and modified so long as such changes and modifications mark no material departure from the salient features of the invention as expressed in the appended claims.

Figure 1:
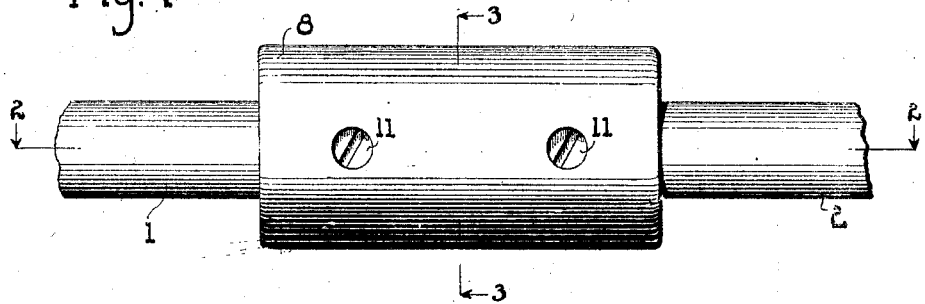
Fig. 1 is an elevation of the coupling structure assembled.
Figure 2:
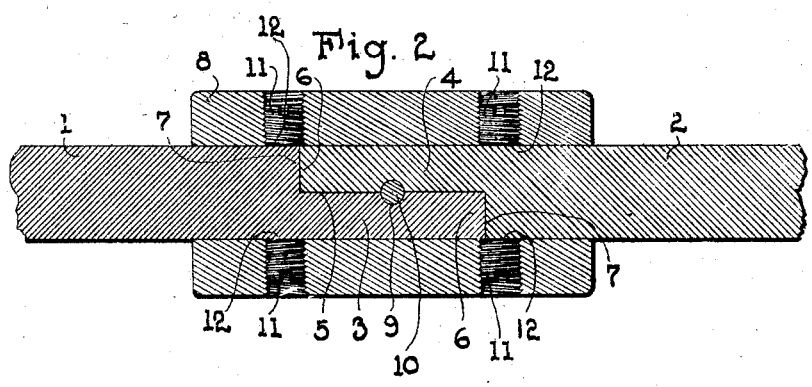
Fig. 2 is a longitudinal section in a plane diametric of the coupling.
Figure 3:
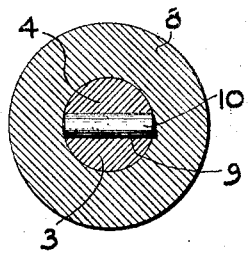
Fig. 3 is a section on the line 3—3 of Fig. 1.

Referring to the drawings, there is shown a bobbin shaft composed of two members 1 and 2, each terminating in a stepped end 3 or 4, as the case may be, which stepped portion may be milled out or otherwise finished to form longitudinal central faces 5, the shaft ends at that point being of a thickness equal to half the diameter of the respective shaft. In this manner the stepped ends of the two shafts bear laterally against each other, and the end portion 6 of each shaft abuts a shoulder 7 on the companion shaft end, whereby the abutting portion of the shaft bear against each other lengthwise and effectively prevent any twisting action of one shaft on the other about the coinciding longitudinal center lines of the two shaft sections.

In order to hold the two shaft sections 1 and 2, together against displacement laterally of each other, there is provided an elongated sleeve or coupling 8 sufficiently extensive to house both ends of the shaft sections 1 and 2 when in abutment, so that these shaft ends will enter the sleeve or coupling from opposite ends thereof and be prevented by the coupling from shifting laterally with relation to each other. Traversing the two shaft sections 1 and 2, midway of the length of the surface 5, is a bore 9 common to both sections and perpendicular to the length of the faces 5. The bore 9 is traversed by a pin 10 which latter, because of the confining action of the sleeve 8, prevents any displacement of the two shaft sections in a direction lateral of the length of either of the shaft sections 1 or 2, or the sleeve 8. The two shaft members 1 and 2 cannot be displaced from their position in the coupling sleeve by any force liable to so act upon them, because of the presence of the sleeve 8 and of the pin 10, and cannot be displaced lengthwise of the sleeve 8 because of the presence of set screws 11 carried by said sleeve 8 and of sufficient length to engage the shaft members 1 and 2. In order to insure firm engagement between the sleeve or coupling 8 and the shaft members 1 and 2, the screws 11 may have rounded or conical ends 12 shaped to bite into the shafts 1 and 2.

The invention is capable of embodiment in a body portion made of cast iron and a transverse locking pin of hardened steel, while the shaft sections 1 and 2 are composed of steel suitable for the purpose and the set screws 11 may also be made of hardened steel.

In assembling the coupling device, the two stepped shafts 1 and 2 are engaged in the direction of their length so that the ends 4 overlap and abut to bring the bores 9 in alignment. Then the pin 10 is introduced through the alined bore 9 and the sleeve or coupling 8 is slipped over the abutted ends of the two shafts, housing the pin 10 in the sleeve 8 against displacement and at the same time holding the two shafts together against movement lengthwise of the sleeve or coupling 8 and against lateral movement with respect to each other and to the sleeve, whereby the whole structure is effectively locked together. The set screws 11 are of such length that their kerf ends are below the level of the outer surface of the sleeve or coupling 8 so that it is impossible for anything to catch on them, thus saving workmen from injury.

What is claimed is:—

1. A coupling for bobbin and other like shafts of equal and uniform diameter comprising two, like, stepped meeting ends of the shafts, a pin traversing the meeting ends in the plane of the adjacent surfaces thereof and engaging both of said meeting ends, a coupling or sleeve surrounding the stepped meeting ends, and movable both longitudinally and rotatably on said ends, and set screws passed through the coupling and engaging the shaft sections and countersunk in the coupling, the coupling or sleeve being imperforate except at the points where the set screws extend therethrough to prevent loss of said pin therethrough.

2. A coupling for bobbin and other like shafts of equal and uniform diameter, comprising two, like, longitudinally stepped meeting ends of the shafts overlapping within the diameter of the shafts, and each shaft abutting at the meeting end against the shoulder of the other shaft, with the overlapping ends provided intermediately with a transverse pin engaging both of the overlapping ends of the shafts, an exterior sleeve or coupling surrounding the overlapping stepped ends of the shaft sections and housing the pin, and movable both longitudinally and rotatably on said shaft sections, and set screws passed through the coupling and engaging the shaft sections for securing the coupling to the shafts against displacement thereon, the sleeve or coupling being imperforate except at the points where the set screws extend therethrough to prevent loss of said pin therethrough.

In testimony that I claim the foregoing as my own I have hereto affixed my signature.

COY CLAY COLLINS.